(12) United States Patent
Kohler Riedi et al.

(10) Patent No.: US 12,514,792 B2
(45) Date of Patent: Jan. 6, 2026

(54) METHODS AND KITS FOR REMOVING CALCULUS USING A METAL ION AND BICARBONATE

(71) Applicant: Solventum Intellectual Properties Company, Maplewood, MN (US)

(72) Inventors: Petra L. Kohler Riedi, Minneapolis, MN (US); Evan Koon Lun Yuuji Hajime, Woodbury, MN (US); Steven P. Swanson, Blaine, MN (US); Chuntao Cao, Woodbury, MN (US); Ingo R. Haeberlein, Weilheim (DE); Tao Gong, Woodbury, MN (US)

(73) Assignee: Solventum Intellectual Properties Company, Maplewood, MN (US)

(*) Notice: Subject to any disclaimer, the term of this patent is extended or adjusted under 35 U.S.C. 154(b) by 993 days.

(21) Appl. No.: 16/342,824

(22) PCT Filed: Sep. 5, 2017

(86) PCT No.: PCT/US2017/050056
§ 371 (c)(1),
(2) Date: Apr. 17, 2019

(87) PCT Pub. No.: WO2018/075150
PCT Pub. Date: Apr. 26, 2018

(65) Prior Publication Data
US 2019/0231649 A1    Aug. 1, 2019

Related U.S. Application Data
(60) Provisional application No. 62/410,711, filed on Oct. 20, 2016.

(51) Int. Cl.
| | | |
|---|---|---|
| *A61K 6/79* | (2020.01) | |
| *A61K 8/19* | (2006.01) | |
| *A61K 8/20* | (2006.01) | |
| *A61K 33/06* | (2006.01) | |
| *A61K 33/10* | (2006.01) | |
| *A61K 33/14* | (2006.01) | |
| *A61Q 11/00* | (2006.01) | |

(52) U.S. Cl.
CPC .............. *A61K 6/79* (2020.01); *A61K 8/19* (2013.01); *A61K 8/20* (2013.01); *A61K 33/06* (2013.01); *A61K 33/10* (2013.01); *A61K 33/14* (2013.01); *A61Q 11/00* (2013.01); *A61K 2800/88* (2013.01)

(58) Field of Classification Search
CPC . A61K 7/16; A61K 6/097; A61K 8/97; A61K 8/41
USPC ............................................. 424/49; 433/215
IPC .................................................. A61Q 11/00
See application file for complete search history.

(56) References Cited

U.S. PATENT DOCUMENTS

| | | | |
|---|---|---|---|
| 1,482,367 | A | 1/1924 | Elledge |
| 3,372,125 | A | 3/1968 | Hill |
| 3,535,421 | A | 10/1970 | Briner |
| 3,678,154 | A | 7/1972 | Widder |
| 3,932,605 | A | 1/1976 | Vit |
| 3,998,945 | A | 12/1976 | Vit |
| 4,155,868 | A | 5/1979 | Kaplan |
| 4,381,247 | A | 4/1983 | Nakagawa |
| 4,417,993 | A | 11/1983 | Gergely |
| 4,436,720 | A | 3/1984 | Pakhomov |
| 4,487,757 | A | 12/1984 | Kiozpeoplou |
| 4,522,805 | A | 6/1985 | Gordon |
| 4,528,180 | A | 7/1985 | Schaeffer |
| 4,894,220 | A | 1/1990 | Nabi |
| 5,071,439 | A | 12/1991 | Weible |
| 5,403,578 | A | 4/1995 | Gordon |
| 5,670,138 | A | 9/1997 | Venema |
| 5,908,614 | A | 6/1999 | Montgomery |
| 5,965,110 | A | 10/1999 | Arnold |
| 6,207,139 | B1 | 3/2001 | Lee |
| 6,221,641 | B1 | 4/2001 | Montgomery |
| 6,331,291 | B1 | 12/2001 | Glace |
| 6,379,654 | B1 | 4/2002 | Gebreselassie |
| 6,440,396 | B1 | 8/2002 | McLaughlin |
| 6,485,709 | B2 | 11/2002 | Banerjee |
| 6,669,929 | B1 | 12/2003 | Boyd |
| 6,685,921 | B2 | 2/2004 | Lawlor |

(Continued)

FOREIGN PATENT DOCUMENTS

| | | |
|---|---|---|
| CN | 104173197 | 12/2014 |
| DE | 1944308 | 3/1971 |

(Continued)

OTHER PUBLICATIONS

"Iodide", Wikipedia, [retrieved from the internet on Jun. 12, 2019], URL <https://en.wikipedia.org/wiki/Iodide>, pp. 1-4.
The extended European search report issued for European Patent Application No. 20823501.0, Jan. 3, 2023, 8 pages.
Rademacher J, Welte T. Bronchiectasis—diagnosis and treatment. Dtsch Arztebl Int. Dec. 2011; 108(48): 809-15. doi:10.3238/arztebl. 2011.0809. Epub Dec 2, 2011. PMID:22211147; PMCID:PMC3244167.
Office Action issued in Brazilian Patent Application No. BR112021024950-8, Aug. 13, 2024, with English translation (5 pages).

(Continued)

*Primary Examiner* — Walter E Webb

(57) ABSTRACT

Methods and kits for removing calculus from a tooth, wherein the method can include applying a component A to the tooth, wherein component A comprises: a metal ion selected from the group of lithium ion, magnesium ion, calcium ion, a precursor thereto, and a combination thereof; and an aprotic base having a pKb in water of greater than 15.4, or a precursor thereto; applying a component B to the tooth, wherein component B comprises a bicarbonate ion or a precursor thereto; wherein components A and B are applied simultaneously or sequentially to the tooth, thereby generating a gas to soften and/or loosen at least part of the calculus on the tooth; and removing at least a part of the calculus from the tooth.

15 Claims, No Drawings

(56) References Cited

U.S. PATENT DOCUMENTS

| | | | |
|---|---|---|---|
| 7,530,808 | B2 | 5/2009 | Cao |
| 7,740,479 | B2 | 6/2010 | Allred |
| 7,816,423 | B2 | 10/2010 | Karim |
| 8,647,608 | B2 | 2/2014 | Yang |
| 8,906,981 | B2 | 12/2014 | Yang |
| 11,046,817 | B2 * | 6/2021 | West .................... C08F 130/02 |
| 2002/0141949 | A1 | 10/2002 | Banerjee |
| 2003/0194382 | A1 | 10/2003 | Chang |
| 2004/0120900 | A1 | 6/2004 | Arsenault |
| 2005/0196348 | A1 | 9/2005 | Georgiades |
| 2006/0051385 | A1 | 3/2006 | Scholz |
| 2006/0099155 | A1 | 5/2006 | MacDonald |
| 2006/0198803 | A1 | 9/2006 | Giniger |
| 2007/0254260 | A1 * | 11/2007 | Alden, IV .............. A61Q 11/00 433/80 |
| 2009/0220919 | A1 | 9/2009 | Yang |
| 2011/0305738 | A1 | 12/2011 | Ladizinsky |
| 2012/0282234 | A1 | 11/2012 | Min |
| 2014/0065417 | A1 | 3/2014 | Higashi |
| 2017/0355173 | A1 | 12/2017 | Tanaka |
| 2017/0367941 | A1 | 12/2017 | Haeberlein |
| 2019/0231649 | A1 | 8/2019 | Kohler Riedi et al. |

FOREIGN PATENT DOCUMENTS

| | | | |
|---|---|---|---|
| FR | 2787778 | | 6/2000 |
| GB | 1492660 | | 11/1977 |
| JP | 4-217618 | A | 8/1992 |
| JP | 0597640 | | 4/1993 |
| JP | 2007-231012 | A | 9/2007 |
| RU | 2432620 | | 10/2011 |
| WO | WO 1992-07550 | | 5/1992 |
| WO | WO 1998-43603 | | 10/1998 |
| WO | WO 1998-057653 | | 12/1998 |
| WO | WO00/62749 | * | 10/2000 ............... A61K 7/16 |
| WO | WO 2009-109533 | | 9/2009 |
| WO | WO 2012-072777 | | 6/2012 |
| WO | WO 2013-055478 | | 4/2013 |
| WO | WO 2016-099875 | | 6/2016 |
| WO | WO 2017/223161 | | 12/2017 |
| WO | WO 2018-075149 | | 4/2018 |
| WO | WO 2018-075150 | | 4/2018 |

OTHER PUBLICATIONS

Office Action issued in Colombian patent application No. NC2021/0016625, Jun. 19, 2025, with English translation (23 pages).
Day, "Catalase And Glutathione Peroxidase Mimics", Biochemical Pharmacology, 2009, vol. 77, No. 03, pp. 285-296.
Easton, "The Behaviour of Mixtures of Hydrogen Peroxide and Water. Part 1. Determination of the Densities of Mixtures of Hydrogen Peroxide and Water", Transactions of The Faraday Society, 1952, vol. 48, pp. 796-801.
Gao, "Nanocatalysts Promote Streptococcus Mutans Biofilm Matrix Degradation And Enhance Bacterial Killing To Suppress Dental Caries In Vivo", Biomaterials, 2016, vol. 101, pp. 272-284.
Koo, "A New Cost Effective Approach For Plaque Control And Tooth Decay Prevention", Penn Center for Innovation, [retrieved from the internet on Jun. 12, 2019], URL < http://upenn.technologypublisher.com/technology/22598 >, p. 1.
Livingston, "The Catalytic Decomposition of Hydrogen Peroxide In An Acid Chlorine-Chloride Solution", Journal of the American Chemical Society, 1925, vol. 47, No. 08, pp. 2069-2082.
Nardello, "Identification of The Precursor of Singlet Oxygen ($^1O_2$, $^1\Delta g$) Involved In The Disproportionation of Hydrogen Peroxide Catalyzed By Calcium Hydroxide", Chemical Communications, 1998, vol. 05, pp. 599-600.
Nardello, "Inorganic Compounds And Materials As Catalysts For Oxidations With Aqueous Hydrogen Peroxide", Journal Of Molecular Catalysis. A Chemical, 2006, vol. 251, No. 1-2, pp. 185-193, XP028015283.
Rauen, "Conversion of the Synthetic Catalase Mimic Precursor TAA-1 into the Active Catalase Mimic in Isolated Hepatocytes", Chemical Biology and Drug Design, 2009, vol. 73, No. 05, pp. 494-501.
Signorella, "Bioinspired Functional Mimics Of The Manganese Catalases", Coordination Chemistry Reviews, 2012, vol. 256, No. 11-12, pp. 1229-1245.
Tovmasyan, "A Comprehensive Evaluation of Catalase-Like Activity of Different Classes of Redox-Active Therapeutics", Free Radical Biology and Medicine, 2015, vol. 86, pp. 308-321.
Wahlen, "Disproportionation Of Hydrogen Peroxide Into Singlet Oxygen Catalyzed By Lanthanum-Exchanged Zeolites", Journal of Catalysis, 2005, vol. 233, No. 02, pp. 422-433.
Wahlen, "Lanthanum-Doped Zinc Hydroxycarbonates For The Catalytic Disproportionation Of Hydrogen Peroxide Into Singlet Oxygen", Journal of Catalysis, 2007, vol. 249, No. 01, pp. 15-23.
Walling, "The Iron(III)-Ethylenediaminetetraacetic Acid-Peroxide System", Inorganic Chemistry, 1970, vol. 09, No. 04, pp. 931-937.
Wu, "Structural, Spectroscopic, and Reactivity Models for the Manganese Catalases", Chemical Reviews, 2004, vol. 104, No. 02, pp. 903-938.
International Search Report for PCT International Application No. PCT/US2017/050056, mailed on Dec. 8, 2017, 4 pages.
Ilan Rotstein, "Role of Catalase in the Elimination of Residual Hydrogen Peroxide following Tooth Bleaching," Nov. 1993, *Journal of Endodontics*, 19(11): 567-69.
Putt et al., "Custom Tray Application of Peroxide Gel as an Adjunct to Scaling and Root Planing in the Treatment of Periodontitis: Results of a Randomized Controlled Trial after Six Months." J Clin Dent 2013;24:100-107 (Year: 2013).
Kraus et al., "Salivary Catalase and Peroxidase values in Normal Subjects and in Persons with Periodontal Disease." O.S, O.M, & O.P. Jan. 1958; vol. 11, No. 1; pp. 95-102 (Year: 1958).
Home Remedies, "Get Rid of Plaque & Tartar on Teeth with Natural Remedies," HomeRemedies.com, Oct. 30, 2009; 3 pages (Year: 2009).

* cited by examiner ates than 15.4, or a precursor thereto; a component B comprising a bicarbonate ion or a precursor thereto; and instructions for applying components A and B to the tooth simultaneously or sequentially, thereby generating a gas to soften and/or loosen at least part of the calculus on the tooth, and for removing at least a part of the calculus from the tooth.

METHODS AND KITS FOR REMOVING CALCULUS USING A METAL ION AND BICARBONATE

CROSS REFERENCE TO RELATED APPLICATION

This application claims the benefit of U.S. Provisional Patent Application No. 62/410,711, filed Oct. 20, 2016, the disclosure of which is incorporated by reference herein in its entirety.

BACKGROUND

Dental calculus may lead to periodontal diseases including gingivitis and periodontitis. The existing methods of removing dental calculus rely upon mechanical means such as scaling by trained dental professionals. Such existing removal procedures can be painful and uncomfortable for patients. In addition, the existing removal procedures can put a significant physical burden on the hygienist, often times leading to muscular and repetitive movement ailments (e.g., carpal tunnel syndrome). Moreover, a significant amount of time during the dental prophylaxis procedure is allocated to calculus removal. It is therefore desirable to create a better solution to remove calculus.

SUMMARY

Some aspects of the present disclosure provide a method of removing calculus from a tooth. The method can include applying a component A to the tooth, wherein component A includes: a metal ion selected from the group of lithium ion ($Li^+$), magnesium ion ($Mg^{2+}$), calcium ion ($Ca^{2+}$, a precursor thereto, and a combination thereof; and an aprotic base having a pKb in water of greater than 15.4, or a precursor thereto; applying a component B to the tooth, wherein component B includes a bicarbonate ion or a precursor thereto; wherein components A and B are applied simultaneously or sequentially to the tooth, thereby generating a gas to soften and/or loosen at least part of the calculus on the tooth; and removing at least a part of the calculus from the tooth.

Some aspects of the present disclosure provide a kit of parts for removing calculus from a tooth. The kit can include: a component A including: a metal ion selected from the group of lithium ion ($Li^+$), magnesium ion ($Mg^{2+}$), calcium ion ($Ca^{2+}$), a precursor thereto, and a combination thereof; and an aprotic base having a pKb in water of greater than 15.4, or a precursor thereto; a component B comprising a bicarbonate ion or a precursor thereto; and instructions for applying components A and B to the tooth simultaneously or sequentially, thereby generating a gas to soften and/or loosen at least part of the calculus on the tooth, and for removing at least a part of the calculus from the tooth.

Definitions

As used in this patent application:

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits under certain circumstances. Other embodiments may also be preferred, however, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements (e.g., preventing and/or treating an affliction means preventing, treating, or both treating and preventing further afflictions).

Herein, various sets of numerical ranges (for example, of the number of carbon atoms in a particular moiety, of the amount of a particular component, or the like) are described, and, within each set, any lower limit of a range can be paired with any upper limit of a range. Such numerical ranges also are meant to include all numbers subsumed within the range (for example, 1 to 5 includes 1, 1.5, 2, 2.75, 3, 3.80, 4, 5, and so forth).

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above Summary section is not intended to describe every embodiment or every implementation of the disclosure. The detailed description that follows more particularly describes illustrative embodiments. Throughout the detailed description, guidance is provided through lists of examples, which examples can be used in various combinations. In each instance, a recited list serves only as a representative group and should not be interpreted as being an exclusive list.

DETAILED DESCRIPTION

Dental calculus (also referred to as dental tartar) is defined as mineralized dental biofilm filled with crystals of various calcium phosphates or dental plaque that has partially or completely calcified. It may be caused by the continual accumulation of minerals from fluids in the oral environment on plaque on the teeth. Dental calculus is a common oral condition afflicting humans and a variety of animal species and the presence of dental calculus may lead to periodontal diseases. The existing methods of removing dental calculus, which rely upon mechanical means such as scaling, are time consuming and laborious for dental professionals, and can be a painful and unpleasant experience for patients.

The present disclosure generally relates to methods and kits of removing calculus from a tooth. Generally, the method can include applying a component A to the tooth, applying a component B to the tooth, wherein components A and B are applied simultaneously or sequentially to the tooth, thereby generating a gas to soften and/or loosen at least part of the calculus on the tooth; and removing at least a part of the calculus from the tooth. In certain embodiments, component A is applied before or after component B is applied.

The method of the present disclosure can, for example, provide an easier removal of dental calculus. In addition, the method of the present disclosure can reduce the time of calculus removal. For example, after the application of component A and component B, removing the calculus is easier and quicker. Thus, the method of the present disclosure can enable improved procedural efficiency, opportunities for more patients, additional time for other procedures and increased rest periods for the dental professional.

In certain embodiments, component A includes: a metal ion selected from the group of lithium ion ($Li^+$), magnesium ion ($Mg^{2+}$), calcium ion ($Ca^{2+}$), a precursor thereto, and a combination thereof; and an aprotic base having a pKb in water of greater than 15.4, or a precursor thereto. The aprotic base often is a halogen-containing anion. In certain embodiments, the aprotic base is a halide (e.g., iodide, bromide, and chloride).

In certain embodiments, the aprotic base of component A includes triflate ion (OTf), iodide ion ($I^-$), perchlorate ion ($ClO_4^-$), bromide ion ($Br^-$), chloride ion ($Cl^-$), or a combination thereof.

In certain embodiments, a precursor of a metal ion of component A includes a solid salt (e.g., a lithium halide, a magnesium halide, a calcium halide, or a combination thereof). In certain embodiments, a precursor of an aprotic base having a pKb in water of greater than 15.4 includes a solid salt (e.g., a lithium halide, a magnesium halide, a calcium halide, a sodium halide, a sodium triflate, a sodium perchlorate, or a combination thereof).

In certain embodiments, the metal ion and aprotic base of component A are provided by the same compound. For example, in certain embodiments, component A includes a lithium halide, a magnesium halide, a calcium halide, or a combination thereof. In certain embodiments, component A includes LiCl, $MgCl_2$, $CaCl_2$, or a combination thereof.

In certain embodiments, the metal ion and aprotic base of component A are provided by different compounds. For example, component A could include lithium nitrate and sodium chloride. Component B could include a bicarbonate salt such as potassium bicarbonate or sodium bicarbonate. The key is that the lithium ion, chloride ion, and bicarbonate ion are all present on a tooth.

In certain embodiments, component A is a solid when applied to the tooth that is at least partially dissolved upon mixing component A and component B on the tooth.

In certain embodiments, component A is an aqueous solution when applied to the tooth. In certain embodiments, the aqueous solution comprises greater than 1 M of a metal salt that includes the metal ion. For example, the aqueous solution can contain greater than 1.5 M, greater than 2 M, or greater than 2.5 M of the metal salt that includes the metal ion. In certain embodiments, the aqueous solution includes a saturated solution of the metal ion, or the metal ion at a concentration up to the solubility limit of the metal salt. The concentration of component A is prior to mixing with component B.

In certain embodiments, component A is an aqueous solution when applied to the tooth and the aqueous solution comprises greater than 1 M of a salt containing the aprotic base. The salt of the aprotic base often contains either one or two moles of aprotic base per mole of the salt. For example, the aqueous solution can contain greater than 1 M of the aprotic base or greater than 2 M of the aprotic base. In certain embodiments, the aqueous solution includes a saturated solution of the aprotic base, or the aprotic base at a concentration up to the solubility limit of the salt of the aprotic base. In certain embodiments, the salt of the aprotic base is the same as the metal salt. The concentration of component A is prior to mixing with component B.

In certain embodiments, component B includes a bicarbonate ion or a precursor thereto.

In certain embodiments, a precursor of a bicarbonate ion of component B includes a solid salt (e.g., potassium bicarbonate ($KHCO_3$) and sodium bicarbonate ($NaHCO_3$)).

In certain embodiments, a precursor to a bicarbonate ion includes a carbonate and an acid, which can form the bicarbonate. For example, component B can include a mixture of sodium carbonate plus hydrochloric acid, which forms sodium chloride and sodium bicarbonate.

In certain embodiments, component B is a solid when applied to the tooth that is at least partially dissolved upon mixing component A and component B on the tooth.

In certain embodiments, component B is an aqueous solution when applied to the tooth. In certain embodiments, the aqueous solution includes greater than 0.5 M of a bicarbonate ion. For example, the aqueous solution can have a concentration greater than 1 M, greater than 1.5 M, or greater than 2 M bicarbonate ion. In certain embodiments, the aqueous solution includes a saturated solution of the bicarbonate ion, or the bicarbonate ion at a concentration up to the solubility limit of the bicarbonate salt, or up to 3 M bicarbonate ion. The concentration of component B is prior to mixing with component A.

Upon mixing components A and B (i.e., when components A and B are applied to a tooth), a gas is generated, thereby softening and/or loosening the calculus on the tooth. This gas is believed to be $CO_2$, although this is not a limitation of the present disclosure. The generated gas can, for example, weaken the adhesion between the calculus and tooth surface so that the calculus can be removed easily after relatively short exposure times to component A and component B. In some embodiments, the generated gas can soften and/or loosen the calculus so that the removal of the calculus, for example, by hand scaling is much easier. For instance, the calculus can be removed in a shorter time or with a less force.

Generally, in methods of the present disclosure component A is applied to the tooth surface before or after component B is applied to the tooth surface. In some embodiments, component A is applied at least 30 seconds before or after component B is applied. Either component A or component B can be (independently) in any form suitable for oral cavity delivery, such as in the form of aqueous solutions (e.g., a rinse), a gel, a paste, or a powder. For example, component A and component B can be applied both as rinses. In some embodiments, component A can be applied as a gel and component B can be applied as a rinse.

In some embodiments, component A or component B is applied for a period of less than 1 hour, less than 30 minutes, less than 10 minutes, less than 5 minutes, less than 2 minutes, less than 1 minute, or less than 30 seconds, particularly before applying the other component. In some of these embodiments, component A or component B is applied for 10 minutes, 5 minutes, 2 minutes, 1 minute, 30 seconds, 15 seconds, or a range between and including any two of these values. In some embodiments, both component A and component B are each applied for a period of less than 1 hour, less than 30 minutes, less than 10 minutes, less than 5 minutes, less than 2 minutes, or less than 1 minute.

After component A and component B are applied, at least a part of the calculus can be removed from the tooth by a suitable mechanical means, e.g., scaling (such as using a dental scaler), brushing, swabbing, wiping, ultrasonic scaling, air polishing or jetted water. In some embodiments, the part of the calculus may be removed by mechanical means other than tooth brushing, for example, by a dental scaler. In some embodiments, the removing step occurs within 1 day, 12 hours, 6 hours, 3 hours, 1 hour, 30 minutes, 10 minutes, 5 minutes, 2 minutes, 1 minute, 30 seconds, or 15 seconds, after the applying steps. In some embodiments, the removing step lasts for a period less than 10 minutes, less than 5 minutes, less than 2 minutes, or less than 1 minute. In other embodiments, the removing step lasts 10 minutes, 5 minutes, 2 minutes, 1 minute, 30 seconds, or a range between and including any two of these values. Thus, the method of the present disclosure can, for example, provide an easier and/or quicker removal of the calculus. In some embodiments, the applying steps and removing step are all completed in less than 1 day, less than 12 hours, less than 6 hours, less than 3 hours, less than 1 hour, less than 30 minutes, less than 10 minutes, less than 5 minutes, less than 2 minutes, or less than 1 minute.

In an exemplary embodiment, first solid LiCl in powder form is applied to a tooth surface that includes calculus. After one minute, a potassium bicarbonate rinse solution is applied to the tooth surface. After about two minutes, calculus is hand scaled.

In some embodiments, additives can be applied to the tooth surface. In some of these embodiments, additives can be applied with component A and/or component B. The additives used in the method can include, but are not limited to, antiseptics and preservatives, antibiotics, flavoring materials, surfactants, abrasives, thickeners and binders, propellants, carriers, tartar control agents, calcium sequestrants, fluoride salts, and dyes.

Suitable antiseptics and preservatives can include, but are not limited to, chlorhexidine and salts thereof, polyhexamethylene biguanide, octenidine, quaternary ammonium salts and polymers thereof, organic acids, chelating agents, for example, a calcium chelating agent (e.g., ethylenediaminetetraacetic acid (EDTA)), essential oils, and parabens. Non-limiting examples of antibiotics can include penicillin, tetracycline, minocycline, and the like. Examples of antibiotics can also include those described in U.S. Pat. No. 6,685,921 (Lawlor). Examples of flavoring materials can include artificial sweeteners, plant oils, and synthetic flavors. Examples of abrasives can include silica particles, synthetic inorganic particles, and synthetic or plant derived organic particles. Suitable surfactants can include those described in U.S. Pat. Pub. No. 2006/0051385 (Scholz). Examples of such surfactants include cationic surfactants, zwitterionic surfactants, nonionic surfactants, and anionic surfactants. Examples of thickeners can include glycerol, silica, cellulose-based polymers, plant gums (e.g., guar and xanthan gum), petroleum derived materials such as petrolatum, polyethylene glycols, polyvinyl pyrrolidone and copolymers thereof, polylactic acids, long chain fatty acid alcohols, and acrylate polymers. Suitable binders can include those described in U.S. Pat. No. 8,647,608 (Yang et al.). Suitable carriers can include those described in U.S. Pat. No. 8,647,608 (Yang et al.). Carriers can include any alcohols suitable for use in a subject's oral cavity, including ethanol, isopropanol, and glycerol. Suitable dyes include those conventionally used in dental products. Examples of tartar control agents can include those described in U.S. Pat. No. 6,685,921 (Lawlor). Anti-tartar agents known for use in dental care products can include, but are not limited to phosphate. Phosphates can include pyrophosphates, polyphosphates, polyphosphonates, and mixtures thereof. Pyrophosphate salts can include the dialkali metal pyrophosphate salts, tetra-alkali metal pyrophosphate salts, and mixtures thereof. Examples of fluoride salts can include those described in U.S. Pat. No. 6,685,921 (Lawlor), U.S. Pat. No. 3,535,421 (Briner et al.), and U.S. Pat. No. 3,678,154 (Briner et al.).

The kits of removing calculus from a tooth of the present disclosure can include a component A including a metal ion selected from the group of lithium ion ($Li^+$), magnesium ion ($Mg^{2+}$), calcium ion ($Ca^{2+}$), a precursor thereto, and a combination thereof, an aprotic base having a pKb in water of greater than 15.4, or a precursor thereto; a component B including a bicarbonate ion or a precursor thereto; and instructions for applying components A and B to the tooth simultaneously or sequentially, thereby generating a gas to soften and/or loosen at least part of the calculus on the tooth, and for removing at least a part of the calculus from the tooth. In such kits, component A and/or component B may further include one or more additives as described herein.

EMBODIMENTS

The following embodiments are intended to be illustrative of the present disclosure and not limiting.

Embodiment 1 is a method of removing calculus from a tooth comprising:
    applying a component A to the tooth, wherein component A comprises: a metal ion selected from the group of lithium ion ($Li^+$), magnesium ion ($Mg^{2+}$), calcium ion ($Ca^{2+}$), a precursor thereto, and a combination thereof; and an aprotic base having a pKb in water of greater than 15.4, or a precursor thereto;
    applying a component B to the tooth, wherein component B comprises a bicarbonate ion or a precursor thereto;

wherein components A and B are applied simultaneously or sequentially to the tooth, thereby generating a gas to soften and/or loosen at least part of the calculus on the tooth; and removing at least a part of the calculus from the tooth.

Embodiment 2 is the method of embodiment 1 wherein component A is applied before or after component B is applied.

Embodiment 3 is the method of embodiment 1 or 2 wherein the metal ion and aprotic base of component A are provided by the same compound.

Embodiment 4 is the method of any one of embodiments 1 to 3 wherein the metal ion and aprotic base of component A are provided by different compounds. For example, component A could include lithium nitrate and sodium chloride. Component A is combined with component B, which contains a bicarbonate ion. The key is that the lithium ion, chloride ion, and bicarbonate ion are all present in that example.

Embodiment 5 is the method of any one of embodiments 1 to 4 wherein the aprotic base of component A comprises triflate ion (OTf), iodide ion (I$^-$), perchlorate ion (ClO$_4$), bromide ion (Br$^-$), chloride ion (Cl$^-$), or a combination thereof.

Embodiment 6 is the method of any one of embodiments 1 to 5 wherein the precursor of a metal ion of component A and/or the precursor of an aprotic base comprises a solid salt.

Embodiment 7 is the method of embodiment 5 or 6 wherein component A comprises a lithium halide, a magnesium halide, a calcium halide, a sodium halide, a sodium triflate, a sodium perchlorate, or a combination thereof.

Embodiment 8 is the method of embodiment 7 wherein component A comprises LiCl, MgCl$_2$, CaCl$_2$, or a combination thereof.

Embodiment 9 is the method of any one of embodiments 1 to 8 wherein component A is a solid when applied to the tooth that is at least partially dissolved upon mixing component A and component B on the tooth.

Embodiment 10 is the method of any one of embodiments 1 to 9 wherein component A is an aqueous solution when applied to the tooth.

Embodiment 11 is the method of embodiment 10 wherein the aqueous solution comprises greater than 1 M of a metal salt comprising the metal ion. In some embodiments, the aqueous solution comprises greater than 1 M of the metal ion and greater than 1 M of an aprotic base.

Embodiment 12 is the method of embodiment 10 or 11 wherein the aqueous solution comprises a saturated solution of the metal ion, or the metal ion at a concentration up to the solubility limit of the metal salt.

Embodiment 13 is the method of any one of embodiments 1 to 12 wherein the precursor of a bicarbonate ion of component B comprises a solid salt.

Embodiment 14 is the method of any one of embodiments 1 to 12 wherein the precursor to a bicarbonate ion comprises a carbonate (e.g., a carbonate salt) and an acid, which can form the bicarbonate.

Embodiment 15 is the method of any one of embodiments 1 to 14 wherein component B is a solid when applied to the tooth that is at least partially dissolved upon mixing component A and component B on the tooth.

Embodiment 16 is the method of any one of embodiments 1 to 14 wherein component B is an aqueous solution when applied to the tooth.

Embodiment 17 is the method of embodiment 16 wherein the aqueous solution comprises greater than 0.5 M of a bicarbonate ion.

Embodiment 18 is the method of embodiment 16 or 17 wherein the aqueous solution comprises a saturated solution of the bicarbonate ion, or the bicarbonate ion at a concentration up to the solubility limit of the bicarbonate salt, or up to 3 M bicarbonate ion.

Embodiment 19 is the method of any one of embodiments 1 to 18 wherein component B comprises potassium bicarbonate (KHCO$_3$).

Embodiment 20 is the method of any one of embodiments 2 to 19 wherein component A is applied at least 30 seconds before applying component B.

Embodiment 21 is the method of any one of embodiments 2 to 20 wherein component A is applied for a period of less than 1 hour before applying component B.

Embodiment 22 is the method of embodiment 21 wherein component A is applied for a period of less than 30 minutes before applying component B.

Embodiment 23 is the method of embodiment 22 wherein component A is applied for a period of less than 1 minute before applying component B.

Embodiment 24 is the method of embodiment 23 wherein component A is applied for a period of less than 30 seconds before applying component B.

Embodiment 25 is the method of any one of embodiments 2 to 19 wherein component B is applied at least 30 seconds before applying component A.

Embodiment 26 is the method of any one of embodiments 2 to 19 and embodiment 25 wherein component B is applied for a period of less than 1 hour before applying component A.

Embodiment 27 is the method of embodiment 25 wherein component B is applied for a period of less than 30 minutes before applying component A.

Embodiment 28 is the method of embodiment 27 wherein component B is applied for a period of less than 1 minute before applying component A.

Embodiment 29 is the method of embodiment 28 wherein component B is applied for a period of less than 30 seconds before applying component A.

Embodiment 30 is the method of any one of embodiments 1 to 29 wherein both component A and component B are each applied for a period of less than 1 hour.

Embodiment 31 is the method of any one of embodiments 1 to 30 wherein the removing step occurs within 1 day after the applying steps.

Embodiment 32 is the method of any one of embodiments 1 to 31 wherein the applying steps and removing step are all completed in less than 1 day.

Embodiment 33 is the method of any one of embodiments 1 to 32 wherein at least a part of the calculus is removed by mechanical means.

Embodiment 34 is the method of embodiment 33 wherein at least a part of the calculus is removed by mechanical means other than tooth brushing.

Embodiment 35 is the method of embodiment 33 or 34 wherein at least a part of the calculus is removed by a dental scaler.

Embodiment 36 is the method of any one of embodiments 1 to 35 wherein component A and component B are aqueous solutions when applied to the tooth and wherein the aqueous solution of component A comprises greater than 1 M of the metal ion and greater than 1 M of an aprotic base and the aqueous solution of component B comprises greater than 0.5 M of a bicarbonate ion.

Embodiment 37 is a kit of parts for removing calculus from a tooth comprising:
a component A comprising:
  a metal ion selected from the group of lithium ion ($Li^+$), magnesium ion ($Mg^{2+}$), calcium ion ($Ca^{2+}$), a precursor thereto, and a combination thereof; and
  an aprotic base having a pKb in water of greater than 15.4, or a precursor thereto;
a component B comprising a bicarbonate ion or a precursor thereto; and
instructions for applying components A and B to the tooth simultaneously or sequentially, thereby generating a gas to soften and/or loosen at least part of the calculus on the tooth, and for removing at least a part of the calculus from the tooth.

Embodiment 38 is the kit of parts of embodiment 37 wherein component A and/or component B further includes one or more additives.

Embodiment 39 is the kit of parts of embodiment 38 wherein the one or more additives are selected from antiseptics and preservatives, antibiotics, flavoring materials, surfactants, abrasives, thickeners and binders, propellants, carriers, tartar control agents, calcium sequestrants, fluoride salts, and dyes.

Embodiment 40 is the kit of parts of any one of embodiments 37 to 39 wherein component A and component B are aqueous solutions and wherein the aqueous solution of component A comprises greater than 1 M of the metal ion and greater than 1 M of an aprotic base and the aqueous solution of component B comprises greater than 0.5 M of a bicarbonate ion.

EXAMPLES

The following examples are given to illustrate, but not limit, the scope of this invention. As used herein, all parts and percentages are by weight unless otherwise specified. All commercial materials were used as obtained from the vendor. Unless otherwise specified, materials can be obtained from Sigma-Aldrich Corp. (St. Louis, MO).

Materials and Methods

Calcium chloride ($CaCl_2$) was obtained from EMD Millipore (Billerica, MA) and was dissolved into deionized water to prepare 3 M and saturated solutions.

Lithium chloride (LiCl) was obtained from the Sigma-Aldrich Corporation (St. Louis, MO).

Magnesium chloride ($MgCl_2$) was obtained from CalBiochem (San Diego, CA) and was dissolved into deionized water to prepare 1 M, 3 M and saturated solutions.

Potassium bicarbonate ($KHCO_3$) was obtained from the Sigma-Aldrich Corporation and was dissolved in deionized water to prepare 0.5 M, 1 M, and 3 M solutions.

Strontium nitrate ($Sr(NO_3)_2$) was obtained from Alfa Aesar (Ward Hill, MA) and was dissolved into deionized water to prepare a saturated solution.

Barium nitrate ($Ba(NO_3)_2$) was obtained from Mallinckrodt (St. Louis, MO) and was dissolved into deionized water to prepare a saturated solution.

Extracted human teeth containing multiple regions with calculus deposits (available from various suppliers such as enretec GmbH, Velten, Germany) were stored in 0.5-1.0 wt. % aqueous chloramine-T solution prior to use. To prepare the extracted teeth for calculus removal testing, each tooth was rinsed with deionized water. Hand scaling of calculus deposits as described in the following examples was performed using a universal (i.e., Columbia) curette commercially available from OSUNG MND CO., LTD. (Korea).

Example 1

A region of calculus on an extracted tooth was treated with deionized water and then hand scaled. This was identified as the control region of the tooth.

To a second unscaled region of calculus on the same tooth, solid LiCl was applied, followed by the immediate application of 2-3 drops of $KHCO_3$ (3 M). After waiting approximately two minutes, hand scaling of this region was performed. This was identified as the treatment region of the tooth.

A noticeable improvement in the ease of calculus removal by hand scaling was observed for the treatment region when compared with the control region.

Example 2

A region of calculus on an extracted tooth was treated with deionized water and then hand scaled. This was identified as the control region of the tooth.

To a second unscaled region of calculus on the same tooth, solid $KHCO_3$ was applied, followed by the immediate application of 2-3 drops of $MgCl_2$ (saturated solution). After waiting approximately five minutes, hand scaling of this region was performed. This was identified as the treatment region of the tooth.

A noticeable improvement in the ease of calculus removal by hand scaling was observed for the treatment region when compared with the control region.

Example 3

A region of calculus on an extracted tooth was treated with deionized water and then hand scaled. This was identified as the control region of the tooth.

To a second unscaled region of calculus on the same tooth, 2-3 drops of $KHCO_3$ (1 M) was applied, followed by the immediate application of 2-3 drops of $MgCl_2$ (3 M). After waiting a few seconds, hand scaling of this region was performed. This was identified as the treatment region of the tooth. The process was repeated on an additional five teeth.

For five of the six tooth samples, a noticeable improvement in the ease of calculus removal by hand scaling was observed for the treatment region when compared with the control region.

Example 4

A region of calculus on an extracted tooth was treated with deionized water and then hand scaled. This was identified as the control region of the tooth.

To a second unscaled region of calculus on the same tooth, 2-3 drops of $KHCO_3$ (1 M) was applied, followed by the immediate application of 2-3 drops of $CaCl_2$ (3 M). After waiting a few seconds, hand scaling of this region was performed. This was identified as the treatment region of the tooth. The process was repeated on an additional four teeth.

For all five tooth samples, a noticeable improvement in the ease of calculus removal by hand scaling was observed for the treatment region when compared with the control region.

Comparative Example 1

A region of calculus on an extracted tooth was treated with deionized water and then hand scaled. This was identified as the control region of the tooth.

To a second unscaled region of calculus on the same tooth, two drops of $MgCl_2$ (1 M) was applied, followed by the immediate application of two drops of $KHCO_3$ (3 M). After waiting about 15 seconds, hand scaling of this region was performed. This was identified as the treatment region of the tooth. The process was repeated on a second tooth.

For both tooth samples, no improvement in the ease of calculus removal by hand scaling was observed for the treatment region when compared with the control region.

Comparative Example 2

A region of calculus on an extracted tooth was treated with deionized water and then hand scaled. This was identified as the control region of the tooth.

To a second unscaled region of calculus on the same tooth, two drops of $CaCl_2$ (saturated solution) was applied, followed by the immediate application of two drops of $KHCO_3$ (0.5 M). After waiting about 15 seconds, hand scaling of this region was performed. This was identified as the treatment region of the tooth.

No improvement in the ease of calculus removal by hand scaling was observed for the treatment region when compared with the control region.

Comparative Example 3

A region of calculus on an extracted tooth was treated with deionized water and then hand scaled. This was identified as the control region of the tooth.

To a second unscaled region of calculus on the same tooth, two drops of $Sr(NO_3)_2$ (saturated solution), followed by the immediate application of two drops of $KHCO_3$ (3 M). After waiting about 15 seconds, hand scaling of this region was performed. This was identified as the treatment region of the tooth. The process was repeated on a second tooth.

For both tooth samples, no improvement in the ease of calculus removal by hand scaling was observed for the treatment region when compared with the control region.

Comparative Example 4

A region of calculus on an extracted tooth was treated with deionized water and then hand scaled. This was identified as the control region of the tooth.

To a second unscaled region of calculus on the same tooth, two drops of $Ba(NO_3)_2$ (saturated solution), followed by the immediate application of two drops of $KHCO_3$ (3 M). After waiting about 15 seconds, hand scaling of this region was performed. This was identified as the treatment region of the tooth. The process was repeated on a second tooth.

For both tooth samples, no improvement in the ease of calculus removal by hand scaling was observed for the treatment region when compared with the control region.

Comparative Example 5

A region of calculus on an extracted tooth was treated with deionized water and then hand scaled. This was identified as the control region of the tooth.

To a second unscaled region of calculus on the same tooth, two drops of $KHCO_3$ (1 M) (saturated solution), followed by the immediate application of two drops of aqueous NaCl (3 M). After waiting about 15 seconds, hand scaling of this region was performed. This was identified as the treatment region of the tooth. The process was repeated on two additional teeth.

For all tooth samples, no improvement in the ease of calculus removal by hand scaling was observed for the treatment region when compared with the control region.

The referenced descriptions contained in the patents, patent documents, and publications cited herein are incorporated by reference in their entirety as if each were individually incorporated. Various unforeseeable modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only, with the scope of the disclosure intended to be limited only by the claims set forth herein as follows.

What is claimed is:

1. A method of removing calculus from a tooth, the method comprising:
    applying a component A to the tooth,
        component A is selected from calcium chloride and magnesium chloride, wherein component A is applied as an aqueous solution at a concentration of 3M or a saturated solution;
    applying a component B to the tooth,
        component B is a source of bicarbonate ion,
    wherein component B is applied as an aqueous solution at a concentration of 1 M,
    wherein component A and component B are applied simultaneously or sequentially to the tooth, and
    wherein component A and component B generate gas when combined to soften and/or loosen at least part of the calculus on the tooth; and
    removing at least a part of the calculus from the tooth.

2. The method of claim 1, wherein component A is applied before or after component B is applied.

3. The method of claim 2, wherein component A is applied for a period of less than 1 hour before applying component B.

4. The method of claim 2, wherein component B is applied for a period of less than 1 hour before applying component A.

5. The method of claim 1, wherein component A is a saturated aqueous solution.

6. The method of claim 1, wherein component A is an aqueous solution at a concentration of 3 M.

7. The method of claim 1, wherein the source of bicarbonate ion comprises a carbonate and an acid.

8. The method of claim 1, wherein component B is sodium bicarbonate, potassium bicarbonate, or a combination thereof.

9. A kit of parts for use in a method of removing calculus from a tooth according to claim 1, the kit comprising:
    a component A selected from calcium chloride and magnesium chloride, component A provided as an aqueous solution at a concentration of 3M or a saturated solution;
    a component B is a source of bicarbonate ion, component B provided as an aqueous solution at a concentration of 1M; and
    a set of instructions directing a user to:
        apply component A and component B to the tooth simultaneously or sequentially, and
        remove at least a part of the calculus from the tooth.

10. The method of claim 1 component A is magnesium chloride and component B is sodium bicarbonate, potassium bicarbonate, or a combination thereof.

11. The method of claim 10, wherein component A is an aqueous solution at a concentration of 3M.

12. The method of claim 10, wherein component A is a saturated aqueous solution.

13. The method of claim 1, component A is calcium chloride and component B is sodium bicarbonate, potassium bicarbonate, or a combination thereof.

14. The method of claim 13, wherein component A is an aqueous solution at a concentration of 3M.

15. The method of claim 13, wherein component A is a saturated aqueous solution.

\* \* \* \* \*